United States Patent [19]

Shiraki et al.

[11] Patent Number: 5,349,149
[45] Date of Patent: Sep. 20, 1994

[54] DUAL-PURPOSE FLUID FOR CUTTING AND ELECTRICAL DISCHARGE MACHINING

[75] Inventors: Harumitsu Shiraki; Hiroyasu Sohtome; Kiyoshi Suzuki, all of Kanagawa; Tetsutaro Uematsu, Toyama, all of Japan; Lao-Sou Su, Racine, Wis.

[73] Assignee: Castrol Limited Burmah Castrol House, Swindon, England

[21] Appl. No.: 844,648

[22] Filed: Apr. 1, 1992

[30] Foreign Application Priority Data

Oct. 4, 1989 [JP] Japan .................. 1-259772

[51] Int. Cl.$^5$ .............................. B23H 1/08
[52] U.S. Cl. .................. 219/69.14; 252/49.3; 252/570
[58] Field of Search ............ 219/69.14; 252/49.3, 252/49.5, 52 R, 52 A, 56 R, 570, 578, 579; 72/42

[56] References Cited

U.S. PATENT DOCUMENTS 4,584,450  4/1986  Inoue .................. 219/69.14
4,767,906  8/1988  Takahashi et al. ......... 219/69.14
4,891,162  1/1990  Schnellmann ............. 252/570

FOREIGN PATENT DOCUMENTS 171196     2/1986   European Pat. Off. ....... 219/69.14
54-35594   3/1979   Japan .
56-163840  12/1981  Japan .................. 219/69.14
56-163841  12/1981  Japan .................. 219/69.14
57-21495   2/1982   Japan .
57-132931  8/1982   Japan .
59-73238   4/1984   Japan .................. 219/69.14
61-4623    1/1986   Japan .
62-65737   3/1987   Japan .
62-236624  10/1987  Japan .................. 219/69.14
62-241616  10/1987  Japan .
698745     11/1979  U.S.S.R. .............. 219/69.14

OTHER PUBLICATIONS

Water–based Dielectric Solution for EDM by T. Masuzawa & K. Tanaka in Annals of the CIRP Vol. 32 Jan. 1983.

*Primary Examiner*—Geoffrey S. Evans
*Attorney, Agent, or Firm*—McAndrews, Held & Malloy, Ltd.

[57] ABSTRACT

A cutting and machining fluid applicable to both cutting and electrical discharge machining. This cutting and machining fluid comprises a water-soluble organic compound that shows an electrical resistivity of not less than 10,000 Ω.cm when it is contained in deionized water having an electrical resistivity of not less than 1,000,000 Ω.cm, in a concentration of from 1 to 10 % by weight, a nonionic surface active agent, or a mixture of these. The organic compound is selected from the group of ethylene glycols, propylene glycols, glycol monoethers, and polyoxyethylene fatty acid esters.

12 Claims, No Drawings

DUAL-PURPOSE FLUID FOR CUTTING AND ELECTRICAL DISCHARGE MACHINING

TECHNICAL FIELD

The present invention relates to a dual-purpose fluid for cutting and electrical discharge machining. More particularly, it relates to a fluid applicable to both cutting and electrical discharge machining.

BACKGROUND ART

Molds and dies have been hitherto manufactured in the following way: In usual instances, a workplace is first cut using a cutting machine and then machined by electrical discharging in an insulating medium of an electrical discharge machine so that the workpiece is die-sinked, bored or cut by causing continuous spark discharge between the workpiece and a work electrode. In recent years, it has been proposed to directly impart to a cutting machine the function of electrical discharge machining for the purposes of omitting the troublesome operations to set up the change-over from cutting to electrical discharge machining, decreasing the mold and die manufacturing cost, e.g., saving an installation area for a machine, or improving the machining precision.

Incidentally, used as cutting fluids are solutions having good performance in lubricity, rust prevention and non-flammability, which, however, are not suitable for electrical discharge machining because of their low electrical resistivity. On the other hand, used as fluids for electrical discharge machining are those having a high electrical resistivity and good performance in recovering electrical resistivity by ion-exchange treatment (i.e., electrical discharge machining continuity), which, however, can not promise any rust prevention or lubricity and are not suitable for cutting. Accordingly, when the function of electrical discharge machining is imparted to cutting machines, it has been necessary to use a working fluid exclusively used for the cutting when cutting is carried out and to use a working fluid exclusively used for the electrical discharge machining when electrical discharge machining is carried out. Using different fluids in different steps in this way has brought about the problem of a serious lowering of operating efficiency.

An object of the present invention is to solve the above problem and provide a working fluid applicable to both the cutting and the electrical discharge machining.

DISCLOSURE OF THE INVENTION

The present inventors have discovered that the above object of the present invention can be achieved by a working fluid mainly composed of a certain type of an organic compound, and thus have accomplished the present invention.

The present invention provides a dual-purpose fluid for cutting and electrical discharge machining, comprising a water-soluble organic compound that shows an electrical resistivity of not less than 10,000 $\Omega$.cm when it is contained in deionized water having an electrical resistivity of not less than 1,000,000 $\Omega$.cm, in a concentration of from 1 to 10% by weight.

The present invention also provides a dual-purpose fluid for cutting and electrical discharge machining, comprising a nonionic surface active agent.

The present invention also provides a dual-purpose fluid for cutting and electrical discharge machining, comprising the above water-soluble organic compound and nonionic surface active agent in combination.

BEST MODE FOR WORKING THE INVENTION

A compound having a high electrical resistivity is used as the water-soluble organic compound used in the present invention. More specifically, used is an water-soluble organic compound that shows an electrical resistivity of not less than 10,000 $\Omega$.cm, preferably not less than 50,000 $\Omega$.cm, and more preferably not less than 100,000 $\Omega$.cm, when deionized water having an electrical resistivity of not less than 1,000,000 $\Omega$.cm is used as a solvent and the water-soluble organic compound is dissolved in the solvent in a concentration of from 1 to 10% by weight. This is because use of a compound having a lower electrical resistivity brings about an increase in the electrical conductivity of the fluid, making it impossible to carry out electrical discharge machining.

Examples of the water-soluble organic compound used in the present invention are ethylene glycols, represented by HO—$(CH_2—CH_2—O)_n$—H wherein n=1 to 24: propylene glycols, represented by HO—$(CH_2—CH(CH_3)—O)_n$—H wherein n=1 to 24]; glycol monoethers, represented by RO—$(CH_2—CH_2—O)_n$—H wherein R=a $C_1$ to $C_8$ alkyl group or an aryl group and n=1 to 10; primary alcohols, represented by R—OH wherein R=a $C_4$ to $C_{12}$ alkyl group or an aryl group; polyhydric alcohols, including saccharides such as glycerols, pentaerythritols, sucrose, glucose, fructose and melrose, or reducing sugars such as D-sorbitol, mannitol, starch sugar, xylitol and maltitol; or a mixture comprising a combination of any Of these. Of these water-soluble organic compounds, ethylene glycols, propylene glycols, glycol monoethers, glycerols and sorbitols are preferably used. Particularly preferred are propylene glycol, dipropylene glycol, tripropylene glycol, tetrapropylene glycol, pentapropylene glycol and hexapropylene glycol.

The surface active agent used in the present invention is a nonionic surface active agent. This is because cationic or anionic surface active agents, when formed into an aqueous solution, shows so low an electrical resistivity that no electrical discharge machining can be carried out. Such a nonionic surface active agent is exemplified by polyethylene glycol type nonionic surface active agents, which are ethylene oxide (hereinafter "EO") addition products of higher alcohols, alkyl phenols, fatty acids, polyhydric alcohol fatty acid esters, higher alkylamines, fatty acid amides, oils and fats, polypropylene glycol or the like, or polyhydric alcohol type nonionic surface active agents such as fatty acid esters of glycerol, pentaerythritol, sorbitol, sorbitan, sucrose or the like, alkylethers of polyhydric alcohols, and fatty acid amides of Alkanol amines. In particular, the polyethylene glycol type nonionic surface active agents, which are readily soluble in water, can be preferably used. What can be particularly preferably used are exemplified by polyoxyethylene alkylmonoethers, represented by R—O—$(CH_2—CH_2—O)_n$—H wherein R=a $C_1$ to $C_{22}$ alkyl group or an aryl group and n=1 to 30; polyoxyethylene fatty acid esters, represented by R—CO—O—$(CH_2—CH_2—O)_n$—H wherein R=a $C_1$ to $C_{22}$ alkyl group or an aryl group and n=1 to 30, polyoxyethylene fatty acid diestars, represented by R—CO—O—$(CH_2—CH_2—O)_n$—CO—R wherein R=a $C_1$ to $C_{22}$ alkyl group or an aryl group and $n = 1$ to 30; polyoxyethylene polypropylene glycols, represented by [H—O—($CH_2$—$CH_2$—O)$_x$—($CH_2$—CH($CH_3$)—O)$_y$H wherein $x+y=2$ to 50, polyoxyethylene sorbitan fatty acid esters, represented by

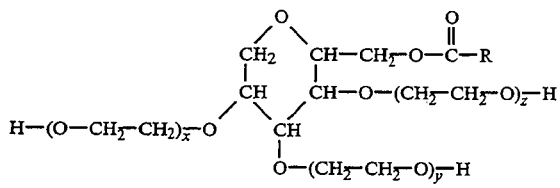

wherein R = a $C_1$ to $C_{22}$ alkyl group or an aryl group and $x+y+z=4$ to 60; those in which EO has been added to a glyceride of a higher fatty acid (molar number of EO: 1 to 60 mol); those in which 5 to 80 mols of EO has been added to lanolin, per group of the hydroxyl group thereof; and those in which 5 to 80 mols of EO has been added to a fatty acid of lanolin. Of the polyoxyethylene alkylmonoethers, polyoxyethylene nonylphenyl ether, polyoxyethylene oleyl ether and polyoxyethylene lauryl ether can be particularly preferably used. Of the polyoxyethylene fatty acid esters, polyoxyethylene cleats and polyoxyethylene laurate can be particularly preferably used. Of the polyoxyethylene polypropylene glycols, those having an EO content of from about 25 to 51 mols can be particularly preferably used.

In the present invention, among the above nonionic surface active agents, what can be most preferably used are those in which EO has been added to a glyceride of a higher fatty acid to give water-solubility. As the glyceride of a higher fatty acid to which the EO is added, it is possible to use those in which a higher fatty acid having a hydroxyl group has been formed into a glyceride or those in which a hydroxy group has been introduced to an unsaturated bond of a glyceride of a higher fatty acid. As those in which a higher fatty acid having a hydroxyl group has been formed into a glyceride, it is possible to use, for example, glycerides of 12-hydroxystearic acid, ricinolic acid (ricinoleic acid) or the like. In particular, in the present invention, natural castor oil or hardened castor oil (a hydrogenated product) containing a glyceride of ricinolic acid as a main constituent can be preferably used.

As previously mentioned, the amount of the ED added to the glyceride of a higher fatty acid ranges preferably from 1 to 60 mols per mol of the higher fatty acid. This amount is an amount necessary to make water-soluble the glyceride of a higher fatty acid. An excessively large amount of the EO makes it difficult to achieve the intended effect of the present invention. For example, in the case of castor oil, the EO is added in an amount of usually from 5 to 60 mols, and preferably from 10 to 30 mols per mol of the castor oil.

In the dual-purpose fluid for cutting and electrical discharge machining according to the present invention, it is preferred to commonly use water as the solvent. This is for the purpose of preventing the working solution itself from firing in the course of cutting and electrical discharge machining. Deionized water can be preferably used as the water. This is because common water contains so much ionic components that it is not suitable for electrical discharge machining.

In the working fluid containing the water-soluble organic compound of the present invention, the water-soluble organic compound is contained in an amount of usually from 10 to 80% by weight, preferably from 15 to 75% by weight, and more preferably from 20 to 70% by weight.

In the working fluid containing the nonionic surface active agent of the present invention, the nonionic surface active agent is contained in an amount of usually from 0.1 to 60% by weight, preferably from 0.5 to 40% by weight, and more preferably from 1 to 20% by weight.

In the working fluid containing the water-soluble organic compound and nonionic surface active agent of the present invention, the both are in an amount of from 3 to 80% by weight, preferably from 5 to 70% by weight, and more preferably from 15 to 60% by weight, in total. In this instance, the nonionic surface active agent in the working solution is in an amount of not more than 30% by weight, preferably not more than 25% by weight, and more preferably not more than 20% by weight.

In addition to the above, conventionally known additives such as rust preventives (as exemplified by Alkanol amine and an fatty acid amide, etc.), water-soluble organic solvents and water-soluble polymers may be used.

The working fluid of the present invention comes to have an electrical resistivity high enough to carry out electrical discharge machining, when it reaches to a specific temperature or a temperature higher then that. This enables application of the working fluid of the present invention to both cutting and electrical discharge machining.

The reason why electrical resistivity varies like the above depending on temperature will be described below.

The cutting and machining fluid of the present invention which contains the water-soluble organic compound and the nonionic surface active agent is usually in the form of an emulsion of an oil-in-water type (O/W type). At a specific temperature or a temperature higher than that, however, the emulsion of an oil-in-water type (O/W type) undergoes a phase change to an emulsion of a water-in-oil type (W/O type), In other words, phase reversal of emulsion occurs between a continuous dispersion medium phase of an emulsion and an independent dispersoid phase thereof. Thus, when the cutting and machining fluid of the present invention is used, cutting is carried out when the fluid is in the state of an O/W emulsion, and then the temperature of the fluid is raised so that the phase is changed to give a W/O emulsion, where electrical discharge machining is carried out. The temperature at which such phase reversal of emulsion takes place depends on the type of the nonionic surface active agent, the molar number for the addition of EO, and the type of the water-soluble organic compound, etc. Hence, these factors may be appropriately selected taking account of conditions for the electrical discharge machining.

The reason why the electrical resistivity of the cutting and machining fluid of the present invention which contains the water-soluble organic compound or the nonionic surface active agent can be presumed as follows. Namely, when the electrical discharge machining is carried out, the hydrogen bonds between the molecules of the water-soluble organic compound or molecules of the nonionic surface active agent and the molecules of water are broken for any reason, for example, because of a rise of the temperature at the surface of a discharge electrode, and at the same time water is evaporated. Hence, the water content of the working fluid in the vicinity of the electrode surface is lowered, in other words, the concentration of the water-soluble organic compound or nonionic surface active agent becomes higher. It also follows that the electrode surface is covered with the water-soluble organic compound or nonionic surface active agent. As a result, the electrical resistivity in the vicinity of the electrode surface is presumed to increase to a value sufficient for the electrical discharge machining.

The present invention will be described below in further detail in the following Examples. The present invention is by no means limited to these Examples. In the following Examples, "%" refers to % "by weight" in all occurrences.

Examples 1 to 3 and Comparative Examples 1 and 2

Dual-purpose fluids for cutting and electrical discharge machining, according to the present invention, were prepared by mixing the respective constituents in the proportions as shown in Table I. These cutting and machining fluids were tested to examine their rust prevention, cutting performance, electrical resistivity and electrical discharge machinability. Results obtained are shown in Table I.

Using a commercially available, non-flammable electrical discharge machining fluid "VITOL QL50" (trade name; S & O Inc.) as Comparative Example 1 and a 1:30 dilution of a commercially available, water-soluble cutting fluid "JR5750" (trade name; Johnson Company, Ltd.) as Comparative Example 2, the same tests as in Examples 1 to 3 were carried out. Results obtained are shown in Table I.

Test methods and evaluation criterions are as follows.

Rust Prevention

In a petri dish, 10 g of FC20 (gray cast iron tips) was placed, to which each fluid was added by 30 ml. After 10 minutes, the fluid was removed from the dish by decantation. After the remaining tips were left to stand at room temperature for 24 hours, the rust formation of each tip was observed. Evaluation was made according to the following criterions.

A: No rust
B: Not more than 10 rust spots
C: Not less than 11 rust spots
D: Not more than ½ spot area
E: Not less than ½ spot area Cutting Performance Using each fluid, drilling and tapping were carried out with an upright drilling machine, and-cutting resistances were measured to indicate tapping torque. Cutting was carried out using HSS (M10×15), at a cutting speed of 1.9 m/min, and using SCM440 (50 diameter ×30) as a workpiece to be cut.

Electrical Resistivity

Measured according to a conventional method

Electrical Discharge Machinability

Electrical discharge machining tests were carried out to examine electrical discharge machining efficiency and electrode wear ratio for each fluid. The tests were carried out using graphite as an electrode material for a cathode, and using S55C (JIC G4051, carbon steel) as a workplace for an anode, under the following electrical discharge machining conditions.

Initial electrical resistivity ($\rho$): 200,000 $\Omega$·cm
Peak electric current (Ip): 40 A
No-load voltage ($E_0$): 120 V

TABLE I

| Constituent (%) and Test item | Example | | | Comparative Example | |
|---|---|---|---|---|---|
| | 1 | 2 | 3 | 1 | 2 |
| Propylene glycol | 44.5 | 47.5 | | | |
| Dipropylene glycol | | | 44.5 | | |
| Castor oil EO adduct (EO: 20 mols) | 5.0 | 2.0 | 5.0 | | |
| Ruster preventive (Oleic acid amide) | 0.5 | 0.5 | 0.5 | | |
| Deionized water | 50.0 | 50.0 | 50.0 | | |
| Rust prevention | A | A | A | E | A |
| Cutting performance (Tapping torgue, kgf·cm) | 57 | 58 | 55 | 70 | 59 |
| Electrical resistivity (KΩ·cm) | 45 | 50 | 65 | 60 | 2 |
| Electrical discharge machining efficiency (g/min) | 0.23 | 0.26 | 0.46 | * | 0 |
| Electrode wear (%) | 0.85 | 1.80 | 0.85 | | ** |

*Not machinable
**Not measurable

Examples 4 to 26 and Comparative Example 3

Dual-purpose fluids for cutting and electrical discharge machining according to the present invention and a comparative fluid were respectively prepared by mixing the constituents in the proportions as shown in Tables II-1 to II-4. Tests were carried out in the same manner as in Example 1 except that the cutting speed was changed to 7.6 m/min, SCM440 (HB226) was used as a workplace, and thread ratio was changed to 75%. Results obtained are shown in Tables II-1 to II-4.

TABLE II-1

| Constituent (%) and Test item | Example | | | | | |
|---|---|---|---|---|---|---|
| | 4 | 5 | 6 | 7 | 8 | 9 |
| Propylene glycol | 49.0 | | | | | |
| Dipropylene glycol | | 49.0 | | | | |
| Tetrapropylene glycol | | | 49.0 | | | |
| Hexapropylene glycol | | | | 49.0 | | |
| Polyethylene glycol (MW: 200) | | | | | 49.0 | |
| Sorbitol | | | | | | 49.0 |
| Polyoxyethylene (9 mols) oleyl ether | | | | | | |
| Polyoxyethylene oleyl ester (MW: 600) | | | | | | |
| Polyoxyethylene (20 mols) hardened castor oil | | | | | | |
| Ruster preventive (Oleic acid amide) | 1.0 | 1.0 | 1.0 | 1.0 | 1.0 | 1.0 |
| Deionized water | 50.0 | 50.0 | 50.0 | 50.0 | 50.0 | 50.0 |
| Electrical discharge machining efficiency (g/min) | 0.26 | 0.27 | 0.29 | 0.26 | 0.20 | 0.21 |
| Electrode wear (%) | 2.02 | 1.90 | 1.32 | 1.95 | 2.40 | 2.53 |
| Cutting resistance (N·m) | 7.72 | 7.66 | 7.74 | 7.73 | 7.71 | 7.70 |
| Rust prevention | A | A | A | A | A | A |

TABLE II-2

| Constituent (%) and Test item | Example | | | | | |
|---|---|---|---|---|---|---|
| | 10 | 11 | 12 | 13 | 14 | 15 |
| Propylene glycol | | | | | | |
| Dipropylene glycol | | | | 69.0 | 39.0 | 25.0 |
| Tetrapropylene glycol | | | | | | |
| Hexapropylene glycol | | | | | | |
| Polyethylene glycol | | | | | | |

TABLE II-2-continued

| Constituent (%) and Test item | Example | | | | | |
|---|---|---|---|---|---|---|
| | 10 | 11 | 12 | 13 | 14 | 15 |
| (MW: 200) Sorbitol | | | | | | |
| Polyoxyethylene (9 mols) oleyl ether | 2.0 | | | | | |
| Polyoxyethylene oleyl ester (MW: 600) | 5.0 | | | | | |
| Polyoxyethylene (20 mols) hardened castor oil | | | 5.0 | | | |
| Ruster preventive (Oleic acid amide) | 1.0 | 1.0 | 1.0 | 1.0 | 1.0 | 1.0 |
| Deionized water | 97.0 | 94.0 | 94.0 | 30.0 | 60.0 | 74.0 |
| Electrical discharge machining efficiency (g/min) | 0.19 | 0.21 | 0.22 | 0.28 | 0.25 | 0.22 |
| Electrode wear (%) | 2.60 | 2.55 | 1.95 | 1.44 | 2.07 | 2.13 |
| Cutting resistance (N · m) | 7.81 | 7.59 | 7.53 | 7.61 | 7.70 | 7.74 |
| Rust prevention | A | A | A | A | A | A |

TABLE II-3

| Constituent (%) and Test item | Example | | | | | |
|---|---|---|---|---|---|---|
| | 16 | 17 | 18 | 19 | 20 | 21 |
| Propylene glycol | | | | | | |
| Dipropylene glycol | 46.0 | 46.0 | 46.0 | 46.0 | 46.0 | 46.0 |
| Tetrapropylene glycol | | | | | | |
| Polyoxyethylene (9 mols) oleyl ether | 3.0 | | | | | |
| Polyoxyethylene (20 mols) oleyl ether | | 3.0 | | | | |
| Polyoxyethylene oleyl ester (MW: 600) | | | 3.0 | | | |
| Polyoxyethylene (20 mols) stearyl ester | | | | 3.0 | | |
| Polyoxyethylene (20 mols) sorbitan monolaurate | | | | | 3.0 | |
| Polyoxyethylene (20 mols) hardened castor oil | | | | | | 3.0 |
| Ruster preventive (Oleic acid amide) | 1.0 | 1.0 | 1.0 | 1.0 | 1.0 | 1.0 |
| Deionized water | 50.0 | 50.0 | 50.0 | 50.0 | 50.0 | 50.0 |
| Electrical discharge machining efficiency (g/min) | 0.35 | 0.30 | 0.34 | 0.34 | 0.32 | 0.45 |
| Electrode wear (%) | 1.13 | 1.17 | 1.44 | 1.47 | 1.45 | 0.92 |
| Cutting resistance (N · m) | 7.38 | 7.39 | 7.38 | 7.32 | 7.40 | 7.30 |
| Rust prevention | A | A | A | A | A | A |

TABLE II-4

| Constituent (%) and Test item | Example | | | | | CE* |
|---|---|---|---|---|---|---|
| | 22 | 23 | 24 | 25 | 26 | 3 |
| Propylene glycol | | 46.0 | | | | |
| Dipropylene glycol | 16.0 | | | | 30.0 | |
| Tetrapropylene glycol | | | 46.0 | | | |
| Ethylene glycol monoethyl ether | | | | 46.0 | | |
| Polyoxyethylene (20 mols) oleyl ether | | | | | | |
| Polyoxyethylene (MW: 600) oleyl ester (MW: 600) | | | | | | |
| Polyoxyethylene (20 mols) stearyl ester | | | | | | |
| Polyoxyethylene (20 mols) sorbitan monolaurate | 3.0 | | | | | |
| Polyoxyethylene (20 mols) hardened castor oil | | 3.0 | 3.0 | 3.0 | 19.0 | |
| Ruster preventive (Oleic acid amide) | 1.0 | 1.0 | 1.0 | 1.0 | 1.0 | |
| Deionized water | 80.0 | 50.0 | 50.0 | 50.0 | 50.0 | 100.0 |
| Electrical discharge machining efficiency (g/min) | 0.31 | 0.39 | 0.46 | 0.42 | 0.41 | ** |
| Electrode wear (%) | 1.54 | 1.10 | 0.71 | 1.19 | 0.98 | |
| Cutting resistance (N · m) | 7.45 | 7.36 | 7.34 | 7.35 | 7.31 | 8.20 |
| Rust prevention | A | A | A | A | A | E |

*Comparative Example
**Unmachinable

As will be evident from the results shown in Table 1 and Table II, the dual-purpose fluid for cutting and electro-discharge machining according to the present invention has a satisfactory cutting performance and electrical discharge machining efficiency. On the other hand, the conventional cutting fluid is not applicable to electrical discharge machining. The conventional electrical discharge machining fluid is also not applicable to cutting.

In particular, the cutting and machining fluid of the present invention in which the water-soluble organic compound and the nonionic surface active agent are used in combination brings about a more improvement in electrical discharge machining efficiency in addition to cutting performance. It further brings about an improvement in machined surface precision and also a decrease in the electrode wear ratio.

INDUSTRIAL UTILIZATION

The dual-purpose fluid for cutting and electro-discharge machining according to the present invention can be used as a fluid applicable to both cutting and electrical discharge machining, and hence is very useful when the cutting and the electrical discharge machining are carried out on the same machine. This can achieve a shortened time for manufacturing molds and dies and a reduction of in the production cost. Moreover, it can omit the operations to change machine parts and move a workpiece, which are conventionally required for the change-over between cutting and electrical discharge machining, and also brings about an improvement in cutting and machining precision.

We claim:
1. A machining fluid comprising:
   from 10 to 80% by weight of a water soluble organic compound selected from the group consisting of ethylene glycols having the formula

$$HO-(CH_2-CH_2-O)_n-H$$

where n = 1 to 24, propylene glycols having the formula $$HO-(CH_2-CH(CH_3))_n-H$$

where n = 1 to 24, glycol monoethers having the formula $$RO-(CH_2-CH_2-O)_n-H$$

where R is an alkyl group having from 1 to 8 carbon atoms or an aryl group and n = 1 to 10, and polyoxyethylene fatty acid esters having the formula $$R_2-COO-(CH_2CH_2)_m-H$$

where $R_2$ is selected from the group consisting of aryl and $C_{17}$ to $C_{22}$ alkyl, and m = 9 to 20; and the balance of the composition comprising deionized water having an electrical resistivity of at least $1 \times 10^6$ ohm cm.

2. The machine fluid of claim 1 wherein the water soluble organic compound is a propylene glycol having the formula HO—(CH2—CH(CH3)—O)$_n$—H where n=1 to 24.

3. The machining fluid of claim 1 wherein the water soluble organic compound is selected from the group consisting of propylene glycol, dipropylene glycol, tripropylene glycol, tetrapropylene glycol, pentapropylene glycol, and hexapropylene glycol.

4. The machine fluid of claim 1 wherein the composition additionally includes from 0.1 to 60% by weight of a nonionic surface active agent and wherein the combined water soluble organic compound and nonionic surface active agent are present in an amount of from 3 to 80% by weight in total.

5. The machining fluid of claim 1, wherein said water soluble organic compound is HO—(CH2—CH2—O)$_n$—H and n=9 to 20.

6. The machining fluid of claim 1, wherein said water soluble organic compound is R2—COO—(CH2CH2)$_m$—H and m=9 to 20.

7. The machining fluid of claim 1, wherein said water soluble compound is one of said glycol monoethers.

8. The machining fluid of claim 1, having an electrical resistivity of more than $1 \times 10^4 \Omega$cm.

9. The machining fluid of claim 1, having an electrical resistivity of at least $4.5 \times 10^4$ $\Omega$cm.

10. A method of machining a conductive workpiece, comprising the steps of:
   A. providing a workpiece,
   B. contacting the workpiece with a first machining fluid having a composition defined claim 1;
   C. machining the workpiece by mechanically cutting it;
   D. contacting the workpiece with a second machining fluid having a composition defined in claim 1; and
   E. electrical discharge machining the workpiece.

11. The method of claim 10, wherein said first and second machining fluids are one machining fluid composition.

12. The method of claim 10, wherein said two contacting steps are carried out by continuously contacting the workpiece with said one machining fluid composition while carrying out said two machining steps.

* * * * *